Feb. 7, 1950
L. B. GREEN
2,496,911
METHOD AND APPARATUS FOR FORMING PLASTIC LAMINATES
Filed June 7, 1945
5 Sheets-Sheet 1
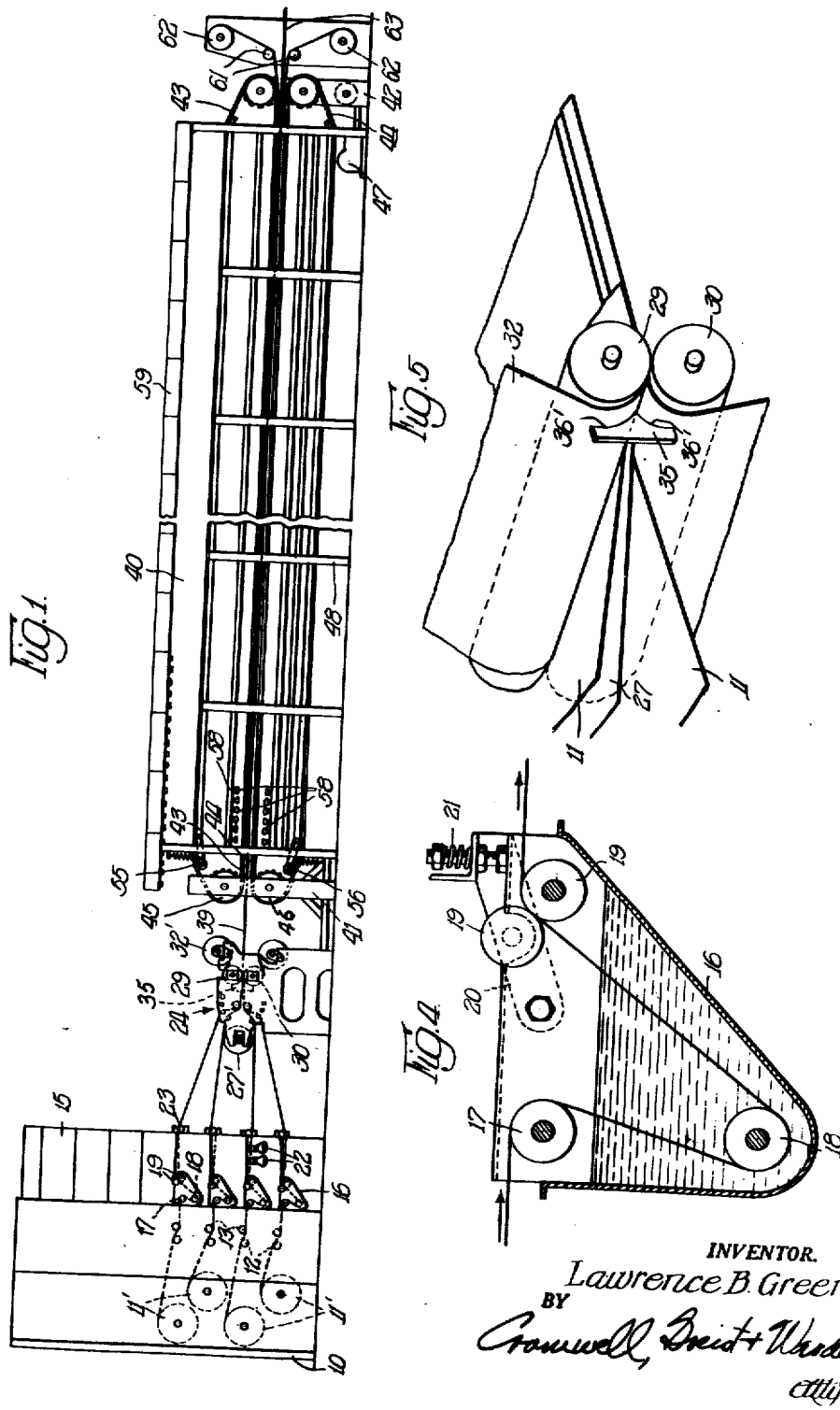
INVENTOR.
Lawrence B. Green,
BY
Cromwell, Greist + Warden
Attys.

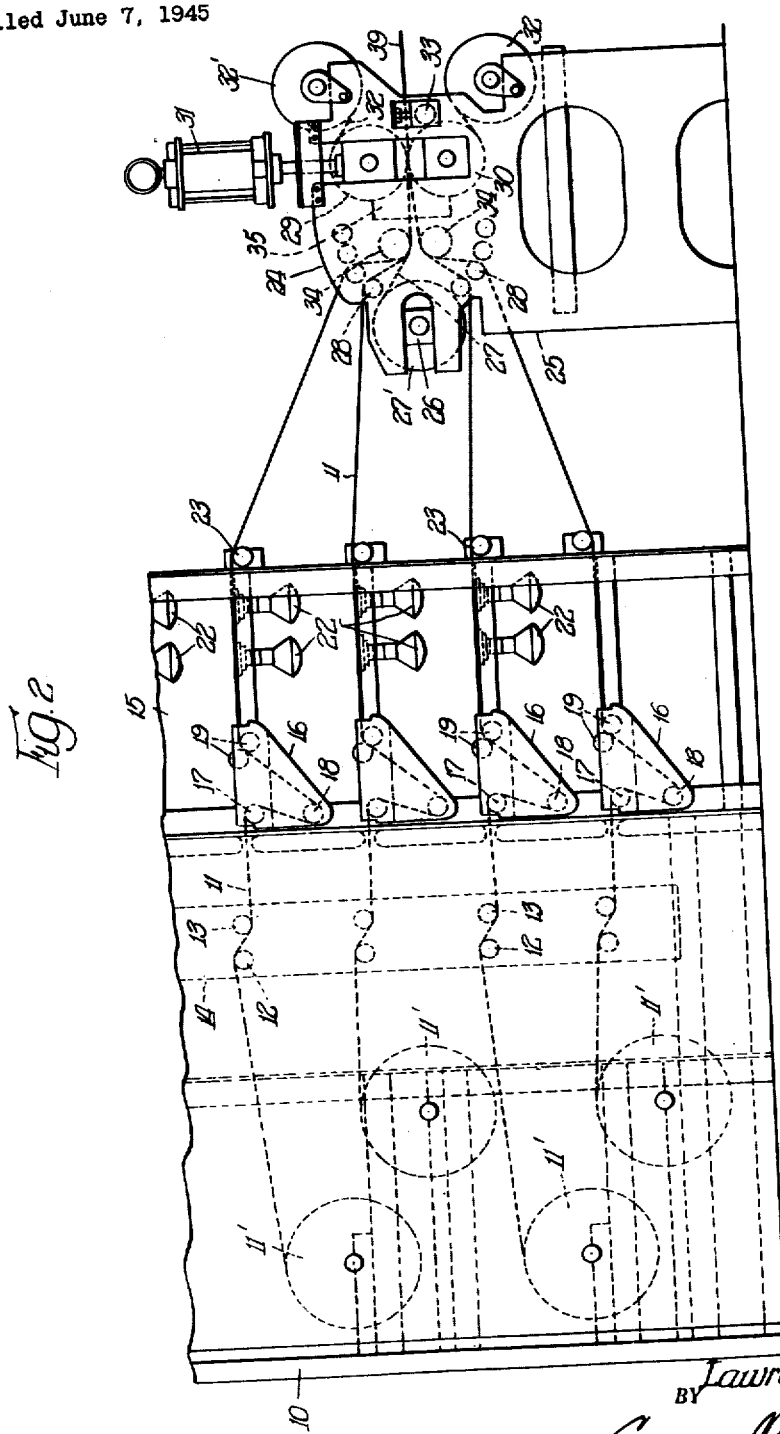

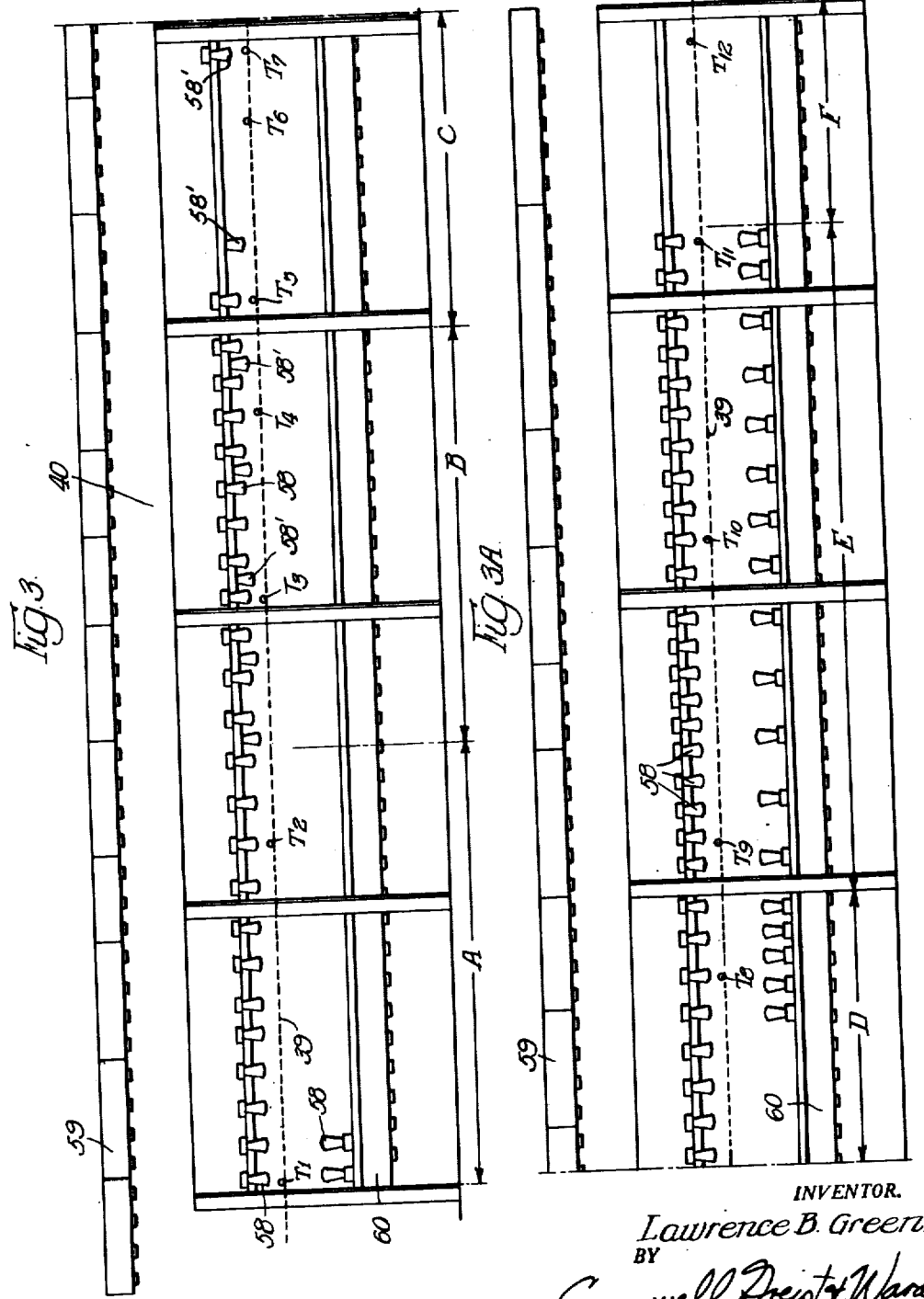

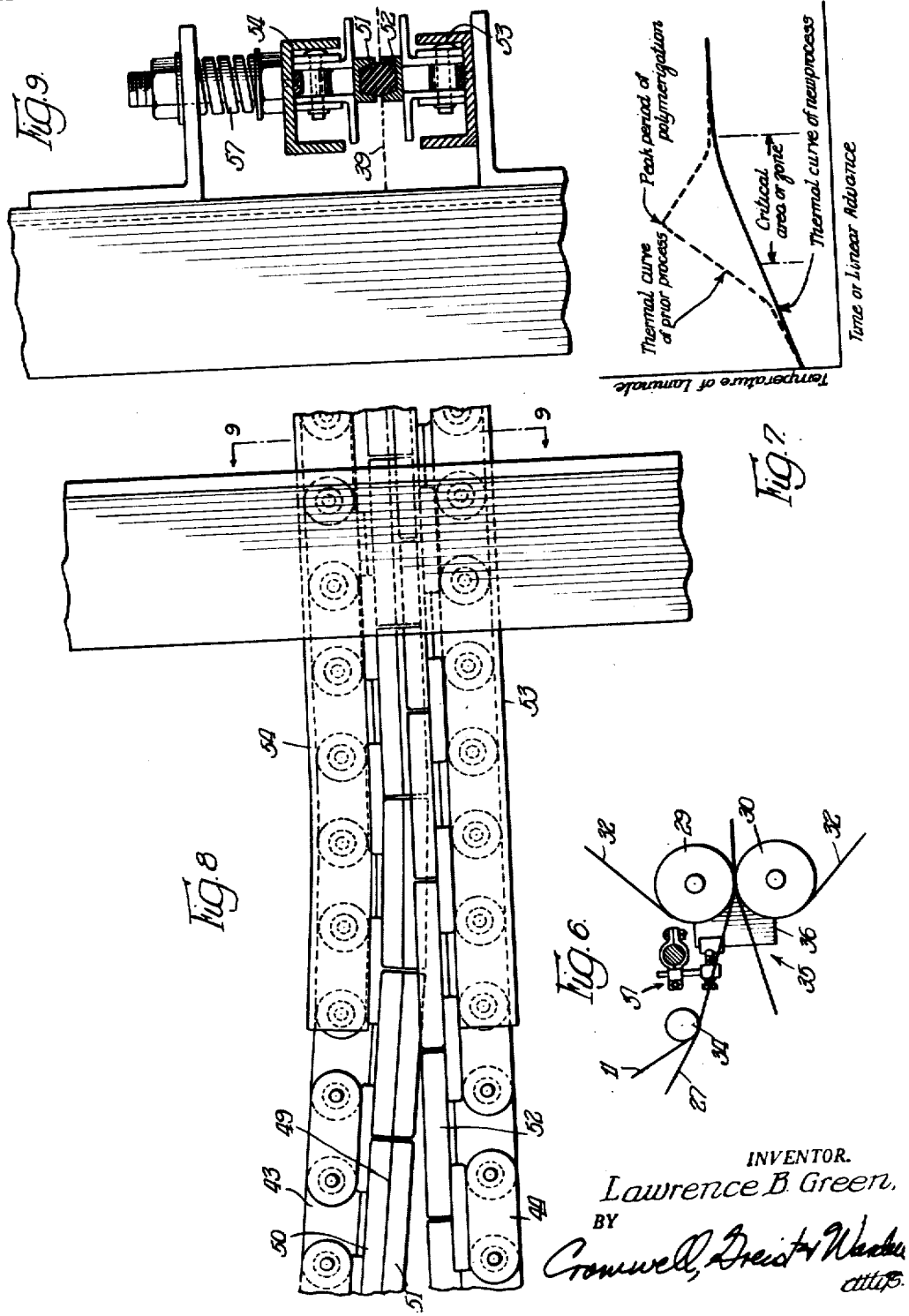

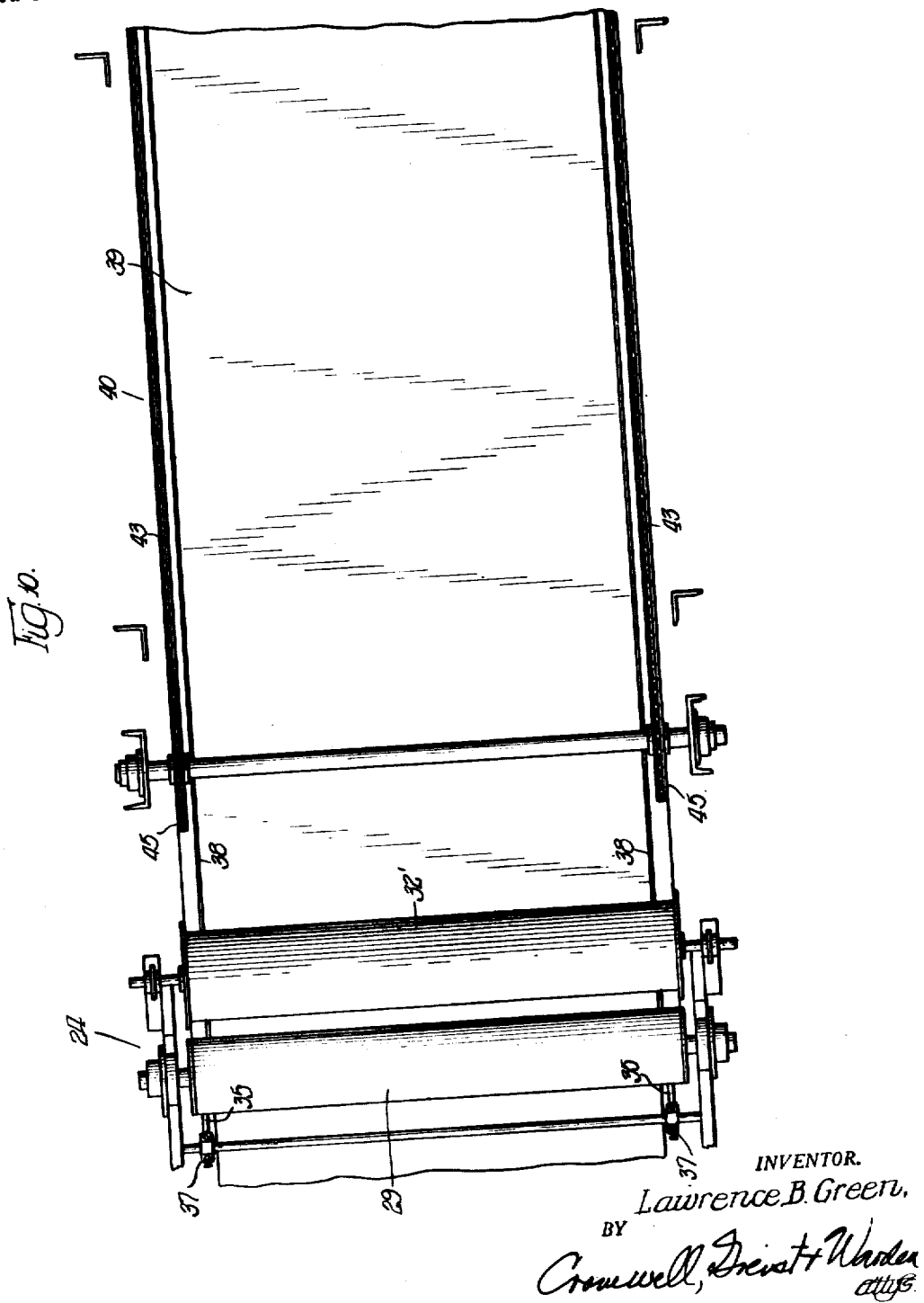

Patented Feb. 7, 1950

2,496,911

UNITED STATES PATENT OFFICE 2,496,911

METHOD AND APPARATUS FOR FORMING PLASTIC LAMINATES

Lawrence B. Green, Glendale, Calif., assignor, by mesne assignments, to Shellmar Products Corporation, Chicago, Ill., a corporation of Delaware Application June 7, 1945, Serial No. 598,146

34 Claims. (Cl. 154—124)

This invention relates to the production of bibulous sheet material impregnated with a solid (non-liquid) organic plastic. More particularly it relates to a method and apparatus whereby flexible bibulous sheet material such as textile fabric, paper, etc. is impregnated with a liquid organic plastic, and subsequently solidified. This application is a continuation-in-part of my present application Serial No. 542,851, filed June 30, 1944, now abandoned.

Solid plastic-impregnated bibulous sheet material such as resin-bonded fabric and paper laminates have been produced principally by impregnating the bibulous sheets with a liquid plastic such as a heat-convertible synthetic resin, placing the impregnated sheets between the platens of a suitable press and solidifying the plastic impregnant under heat and pressure. This procedure is expensive and time-consuming.

Of the various continuous processes which previously have been suggested, none has proved entirely satisfactory for use with textile fabric, particularly where the fabric is required to be impregnated with a relatively rapid-curing resin. The previous processes and apparatus have been insufficiently sensitive to the critical temperature requirements of such resin and insufficiently flexible to meet the difference requirements of different resins. Further, in most cases it has been impossible to produce wholly perfect finished sheets free from defects such as surface pocks, bubbles, etc. Still another drawback has been the waste resulting from the necessity of trimming the edges of sheets produced by previous processes.

I have discovered a method and an apparatus for the improved production of bibulous sheet material impregnated with a solid (non-liquid) organic plastic.

It is an object of the invention to provide a continuous process for the production of laminates of plastic impregnated materials incorporating a bibulous fibrous sheet in a limited time and under readily attainable conditions, which process precludes premature polymerization of the plastic materials and results in a product of uniform density, hardness and strength throughout its entire area and section.

It is a further object of the invention to provide a process of producing plastic impregnated laminates characterized by improved uniformity of thickness, color, and with uniform bonding of the laminae, having high tensile and compressive strength and characterized by a very effective and even surface finish.

A still further object is to provide a process for producing a laminate of the type described, wherein the possibility of the occurrence of entrapped air between the laminae is eliminated, and wherein a lateral sealing area or bead is provided to this end.

Yet another object is to provide a process or method for producing laminates of the above described character in a continuous and uninterrupted manner, without manual manipulation during the course thereof, wherein the polymerization of the plastic impregnant is closely controlled throughout the cycle of the process.

More specifically, an object is to provide a process of the type described and apparatus for putting the same into practice, wherein the application of heat to the laminate is interrupted at a predetermined phase of the curing or polymerization cycle to prevent premature and undesirable completion of polymerization.

A still further object is to provide a method and apparatus of the type described in which a plastic impregnated laminate is advanced continuously and progressively through a heat curing cycle, wherein provisions are made to cease application of heat at a point corresponding to the peak point of polymerization during movement of the laminate at its prescribed optimum rate of travel.

Yet another object is to provide a method and apparatus of the type described having provision for applying transverse tension on a plastic impregnated laminate and accompanying envelope therefor during longitudinal travel of the envelope and laminate, with resultant improvement in the characteristics of the desired article.

A still further object is to provide a process and apparatus of an extremely flexible and versatile character adapted to accommodate the processing of various types of plastic or resin impregnated fabric laminates whose production is contemplated by this invention.

Other more specific objects and advantages of the invention will be apparent to those skilled in the art upon a full understanding of the improved method and apparatus herein described.

In the drawings,

Fig. 1 is a diagrammatic view in side elevation illustrating in a general manner an apparatus for practicing the present invention;

Fig. 2 is a fragmentary view in side elevation illustrating in somewhat greater detail a portion of the apparatus of Fig. 1, in particular the web supply, resin impregnating, preliminary heating and web compounding structure thereof;

Figs. 3 and 3A are diagrammatic views in side elevation, further illustrating structural details of the apparatus of Fig. 1, in particular the curing section thereof, it being understood that Fig. 3A is a continuation of the right-hand side of Fig. 3;

Fig. 4 is a detail view in vertical longitudinal section illustrating one of the web impregnating baths associated with the apparatus illustrated in Fig. 2;

Fig. 5 is a schematic view in perspective, diagrammatically illustrating the web compounding rollers and bead controller structure involved in the apparatus;

Fig. 6 is a diagrammatic view in side elevation still further illustrating the bead controller and compounding roller structure;

Fig. 7 is a graph comparing the temperature curve during the curing phase or cycle obtainable by the present invention and a characteristic curve in prior processes involving uniform external heating during curing;

Fig. 8 is an enlarged fragmentary view in side elevation illustrating structural details of the chain conveyor associated with the apparatus;

Fig. 9 is a fragmentary view in transverse vertical section through the conveyor, illustrating details of structure thereof and the mode of operation of the conveyor on a traveling web handled thereby; and Fig. 10 is a top plan view further illustrating features of the web compounding and feeding components of the apparatus.

In accordance with one aspect of my invention, bibulous sheet material impregnated with liquid organic plastic, such as a polymerizable resin, is cured (i. e., the plastic is solidified) by being continuously advanced along a path having two linearly disposed areas, each of which is subjected to polymerization activating energy, such as the energy from heat lamps, and a third non-activating area intermediate between the two activating areas. Thus, a single web of impregnated fabric, or a plurality of superimposed webs, may be passed beneath a bank of energized heat lamps having a linearly intermediate area containing no energized heat lamps. Preferably, and in many cases necessarily, the impregnated material is enclosed in a continuous, concomitantly advancing envelope of non-bibulous sheet material such as cellophane, which is gripped at the edges by endless chains, or other suitable conveying means, which do not grip the impregnated material. In the preferred method of operation, the impregnated material during curing is held under tension resulting from the transverse tensing of the cellophane envelope, either by positive force externally applied, or by subjecting the cellophane to conditions under which it would normally contract, such as elevated temperatures, while preventing contraction. Other aspects of the invention will be apparent from the following description.

Referring to Figs. 1, 2 and 4 of the drawings, the reference numeral 10 designates a supporting framework on which various rolls 11' of the woven textile fabric employed in the present method are rotatably mounted. The nature of the material of these webs and equivalents thereof will be hereinafter referred to in detail. The material is drawn therefrom under tension produced in the succeeding sections of the apparatus around idler guide rollers 12, 13 mounted on a support 14, thence into an impregnating and preliminary drying section 15. It should be noted that the apparatus illustrated contains supply rollers and sufficient impregnating and related equipment for the handling and laminating of two pairs of webs 11 for the production of a laminate having four plies of the fabric 11. Obviously, if desired, the number of plies may be increased or diminished as desired merely by increasing or diminishing the applicable apparatus to be described.

The section 15 incorporates a bath or tank 16 for each of the webs, in which tank is mounted a guide roller 17 over which the web is led, a second guide roller 18 immersed in the liquid plastic or resin in said tank, and a squeeze roller couple 19 for regulating the quantity of plastic or resin in the fabric as it leaves the tank. The nature and choice of materials which may be employed in tanks 16 will be discussed in detail in the specification to follow.

In order to enable the pressure exerted by squeeze rolls 19 to be regulated, one thereof is mounted on a pivoted arm 20 (see Fig. 4), being resiliently urged against the other thereof by a coil spring 21, the compression of which may be regulated as desired by conventional means. Leaving the impregnating bath, the webs then pass beneath preliminary heating means 22 in section 15 for raising the temperature of the webs and improving the uniformity of impregnation thereof. I prefer that the heating means 22 take the form of conventional 250 watt, infrared lamps.

After preliminary warming by lamps 22, webs 11 travel over guide rolls 23 in the gathering or compounding section of the apparatus which is generally designated by the reference numeral 24. This is mounted on a supporting base 25 affording an adjustable mount 26 for a roll 27' of cellophane or other non-bibulous sheet material 27, as well as a plurality of idler guide rollers 28 for the webs 11 adjacent said roll 27'. The base 25, on one side of the above described rollers 28, likewise journals a pair of steel compounding cylinders 29, 30, with pneumatic or hydraulic means generally designated 31 for variably regulating the pressure exerted by said cylinders on a laminated web passing therebetween. The reference numeral 32' is used to designate a pair of further supply rolls of covering material 32 such as cellophane or other non-bibulous material, these rolls being appropriately journaled on the base in any desired fashion and being disposed for the feeding of covering webs therefrom around the compounding cylinders 29, 30, in the fashion illustrated in Fig. 2. The reference numeral 33 designates a conventional gauge for indicating the thickness of the compounded laminate issuing from between rollers 29, 30, or, more accurately, the distance between said rollers.

A study of Fig. 2, indicates that the web plies 11, after passing over guide rollers 28, are brought together in passing around preliminary compounding rolls 34 and are in turn brought together with the separator web 27, said web being slightly wider, for example, one inch wider, than the web laminae 11. Entering the nip or bight of compounding cylinders 29, 30, the thus laminated webs 11 have further covering webs 32 superimposed on opposite sides thereof, said webs 32 being of somewhat greater width than the separator web 27 and adapted to be stripped from the laminate following curing thereof.

In association with the compounding cylinders 29, 30, I provide the bead controller device particularly illustrated in Figs. 5, 6 and 10 and generally designated by the reference numeral 35. This device consists of a pair of conformed limit plates or blocks 36, preferably fabricated of a transparent cast polymethyl methacrylate, one on either lateral side of the separating web 27 and the converging covering webs 32, having the forward surface thereof of double concave form so as to extend well into the nip of the compounding cylinders 29, 30. Each of the concave surfaces 36' of the plate 36 extends around an arc of approximately 80° of the cylinder surface. Each of the bead controller plates is disposed in a vertical plane paralleling the direction of travel of the webs, and in order to enable proper adjustment thereof between the nip of the cylinders, as well as lateral positioning thereof, I provide a fixture of the type generally indicated by the numeral 37 which will enable lateral and vertical adjustment of the plates 36, as well as forward and rearward adjustment with respect to the nip of the cylinders 29, 30.

The respective bead controller plates 36 are disposed between adjacent margins of the separator and covering webs 27, 32, respectively, and serve to restrict the lateral flow of impregnating material under the compressive action of the cylinders 29, 30 so as to form a continuous longitudinal bead of the impregnating resin or plastic adjacent and between the edges of the webs 11 from which the material is exuded and the margins of the separator web 27, all between the covering webs 32. The aforesaid bead is illustrated in Fig. 10 and designated by the reference numeral 38.

It is advantageous to fabricate the bead controller plates 36 of a transparent plastic of the type mentioned because of the desirability of viewing the beading operation during the operation of the apparatus and likewise because of the fact that this plastic characteristically softens slightly in operation during its frictional contact with webs 32 as well as its contact with the warm impregnating resin, and thereby seats itself in close contact with the cellophane covering webs 32 as they pass around the compounding cylinders. The extent of friction involved in the aforesaid contact is readily adjustable by manipulation of the mounting means 37.

In practice, it may be desirable to fabricate each of the bead controllers 35 at each lateral side of the laminate in two pieces, to the end that if it were desired to widen the nip between compounding cylinders 29, 30, each cylinders would carry with it its individual coacting bead controller element. I have not illustrated this embodiment since provisions for effecting such an end will readily occur to those skilled in the art. Likewise, as a practical matter of production, it may be necessary, when commencing operation, to prime the bead by addition of a small amount of the impregnating material adjacent the bead controllers, and such priming may be also resorted to as necessary from time to time during operation. Regardless of this, the controller plates 36 at all times prevent the impregnating material from reaching the extreme edges of the envelope, i. e., the covering webs 32. In all cases, the continuous bead 38 resulting from the foregoing provisions is coextensive with and obscures the edges of the separating web 27, so as to seal the laminate laterally.

The squeezing of the cellophane and fabric webs at cylinders 29, 30 removes excess impregnating material, expels entrapped air, and flattens and compresses the fabric. After leaving the cylinders, the natural resiliency of the fabric effects a slight expansion in thickness thereof. Thus the density of the laminates decreases slightly and a slight vacuum is created between the cellophane covering webs 32 in the region of the laminate. The existence of such a vacuum is indicated by the immediate and extensive entry of air into the laminate if the covering cellophane is punctured. This vacuum pulls the cellophane webs 32 into extremely intimate contact with the laminate, usually causing the cellophane to tend to enter the interstices in the fabric, as indicated by a noticeable pattern in the cellophane webs 32, after they have been stripped from the laminae. Thus a desirable gripping action is exerted between the cellophane cover or envelope and the laminate.

Since such a vacuum tends to suck the resin beads 38 inwardly, the viscosity of the resin at the temperature employed must be such that, coupled with its inherent surface tension and the cohesive forces between the resin and cellophane and resin and fabric, the sucking action is sufficiently resisted to maintain the resin bead 38 in an appreciable width along both edges of the laminate until the resin in the fabric is cured to a solid or non-liquid state. In the absence of such beads along both edges of the laminate, a perfect, fully impregnated product is not attainable by the continuous process described, for they prevent entry of air in the laminate; if air is permitted to enter, it immediately "runs" over a large area of the laminate, spoiling or marring that area as to appearance, strength and other factors. However, in certain cases where laminates of inferior quality are satisfactory, the beads 38 may be dispensed with. Bead controllers 35 function effectively to position and regulate the beads 38; however, in certain cases they are not necessary and may be dispensed with.

After passing through the compounding section 24, the enveloped laminate designated by the reference numeral 39 next passes into and through the curing section of the apparatus, indicated by the reference numeral 40, which is illustrated in Figs. 1, 3, 3A, 8, 9 and 10. Referring to Fig. 1, this section comprises a suitable support, including upright standards 41, 42 at either end of elongated pairs of chain conveyor belts 43, 44 on which drive sprockets 45, 46 for said conveyors are journaled. Drive of the sprocket is accomplished in a conventional manner from a motor 47. Intermediate the conveyor drive sprockets at either end of the conveyor, there is disposed a curing framework or support designated 48 on which heat curing instrumentalities are disposed in a particular manner, to be hereinafter described in detail.

Referring to Figs. 8, 9 and 10, in conjunction with Fig. 1, the chain conveyors 43, 44 are disposed in vertically coacting relationship adjacent either opposite edge of the cellophane envelope of the compounded web 39, with the edges of the covering webs 32 of said envelope gripped tightly between the gripping elements of the respective conveyors. The conveyor 43 is provided with a plurality of successive male gripping elements 49, each in the form of a channel-shaped support 50 secured to a link of the chain, and a friction gripping bar 51 of neoprene or other suitable material secured in the channel thereof and coextensive with said channel. These bars of the conveyor 43 are arranged in closely spaced relation to one another as illustrated in Fig. 8. Lower conveyor 44 is provided with a plurality of female gripping members 52 of channel section which are secured to links of the conveyor 44 in closely spaced relation therealong and preferably staggered longitudinally with reference to the gripping bars 51 of the conveyor 43, the section of members 52 being in conformity with the exposed section of the gripping bars, as illustrated in Fig. 9.

The upper pass or traverse of the lower chain conveyor 44 is supported and guided in an elongated fixed channel or way 53, while the coacting lower pass or traverse of the upper conveyor 43 is similarly guided in a way 54, the latter being curved upwardly at the end in which the conveyor enters, as illustrated in Fig. 8.

Suitable conventional means such as is illustrated in Fig. 1 and designated by the reference numerals 55, 56 is preferably provided to automatically regulate the tension of the conveyors 43, 44, respectively, so as to compensate for changes in the length thereof arising from temperature change.

In operation of the chain conveyors, the adjacent reaches thereof meet along a line substantially in the plane of the advancing laminated web 39, and the lateral spacing of the conveyors is such that the bars 51 and coacting members 52 engage the laminated web internally of the margins thereof, but externally of the respective beads 38; and the web is snugly and effectively gripped in the channel-like female members 52 by the frictional gripping bars 51 as the conveyors converge into operative relation, in such a manner as to tension the web transversely and exert sufficient friction thereon to pull the same through the machine. Thus, the web 39 is smoothly and continuously drawn through the curing section 40 under sufficient tension to unwind the various component laminae thereof from their sources of supply and advance the same through the impregnating, preliminary drying and compounding sections. Either or both of the chains may be driven by suitable connections from the motor 47. However, I find it preferable to actuate only the lower pair of conveyors.

I prefer that the lowermost conveyor 44 be rigidly supported as it passes over the way 53, but the upper way is preferably supported in a resilient manner by the spring mount 57 associated with upper way 54 in the manner illustrated in Fig. 9.

As the envelope and enclosed laminate constituting web 39 are fed through curing section 40, they are subjected to heat from the upper and lower series or banks of heating elements 58 preferably in the form of 250 watt infrared lamps similar to the preliminary heating lamps 22. The arrangement of these lamps, which is of primary importance in the invention, is clearly illustrated in Figs. 3 and 3A, which should be viewed as a single feature with Fig. 3A constituting merely a continuation of the right-hand side of Fig. 3. A showing of the chain conveyors 43, 44 has been omitted from Figs. 3 and 3A for the purpose of clarity of illustration and Figs. 3 and 3A are intended primarily to show a practical arrangement of lamps 58 on opposite vertical sides of web 39 and the relative concentration or omission of said lamps along the path of travel of the curing section 40. To this end, the curing section illustrated in Figs. 3 and 3A has been subdivided in sections in accordance with the distribution of the heating lamps.

The lamps 58 are arranged in rows extending transversely of the curing section and of the width of the web traversing the same, and unless otherwise indicated, in a transverse spacing approximately equal to the longitudinal spacing illustrated. In order to insure complete uniformity of heating, the lamps in successive rows spaced longitudinally of the section 40 are staggered laterally, i. e., with a lamp in a given row projecting heat vertically onto an area of the web between the areas of vertical projection of heat of adjacent lamps in a preceding or successive row. The web first traverses a section A wherein the greatest concentration of lamps 58 occurs above the traveling web 39, there being only two rows of lamps below the web immediately adjacent the point of entry thereof into the curing section, i. e., at the entrance of section A. These upper and lower lights 58 serve to initiate polymerization of the plastic or resin impregnating material immediately. However, it is not desired that this polymerization proceed at too fast a pace upon initial entry of the web; hence, following initiation of polymerization, only sufficient lamps 58 are provided in the upper bank to insure an even continuance of the polymerization and further lamps are omitted from the lower bank of section A (likewise through sections B and C) to be described. The reason for this omission is that, once initiated, the polymerization is exothermic and heat is rapidly built up in the laminate as the polymerization proceeds; therefore, if excessive external heating of the laminate were permitted at these stages, the resin would be heated to such a high temperature as to cause volatilization of some of the resin. In section B the arrangement of the heating lamps is similar, with the addition of certain further marginal lamps, particularly designated 58', at the sides of the section above the edges of the advancing web 39 for the purpose of maintaining required temperatures at these edges. Lacking such additional provisions, the edges of the relatively wide (44 inches or more) laminate, tend to cool unduly during the curing, with resultant non-uniformity of curing throughout the width of the web.

Following section B a section C is traversed in which no heating lamps are employed in either the upper or lower bank (except for whatever marginal lamps 58' are required to maintain uniform marginal temperature), so as to allow the curing phenomenon to proceed under inherently generated heat. After leaving section C, a section D is traversed wherein heating is resumed at first by a series of upper rows only, spaced in accordance with the spacing of section A, succeeded by heating by a similarly spaced lower bank. In section E the concentration of lamps in the lower bank is diminished while in the upper bank the use of marginal lamps 58' is resumed to insure uniform curing, while during the final run of the web through section F all heating provisions are omitted to enable the laminate to cool.

The above described arrangement provides a highly desirable heat curing phase for the following reasons. When a laminate is cured by being passed through a uniformly externally heated polymerization zone, in other words, a polymerization zone having relatively uniform temperature gradient due to external heating, the temperature of the laminate itself ordinarily increases relatively slowly in the first part of its progression through such a curing zone, then rises sharply to a peak known as the "peak period of polymerization," and finally falls in what may be a sharp temperature drop. This is undesirable since if an extremely high temperature is prematurely reached, volatilization of the resin occurs and the reaction "runs away." Likewise, the catalysts may be destroyed by high temperatures, preventing complete curing in the latter part of the curing zone. Benzoyl peroxide is typical of a catalyst susceptible to such destruction. In order to prevent this, I have provided an area representd by section C and which may be called a "critical area" in which the heating means, both above and below the web 39, are omitted (except for such marginal heating lamps as may be required to maintain the temperature of the margins of a wide laminate equal to its temperature near the center). It is within this "critical area" that the peak period of polymerization normally occurs and the purpose of maintaining the same externally unheated is to reduce normal temperature fluctuations of the laminate. For any given laminate, the location and extent of the critical area are, in practicing my invention, so correlated with the speed of travel of the web that the temperature of the laminate at any given point thereon is altered relatively uniformly as the laminate progresses linearly. Further, the extent of the non-heated critical area represented by section C is desirably so adjusted that the temperature of the laminate does not appreciably fall in passing through the critical area or in passing from the critical area into the heated areas of succeeding sections D and E.

In the particular machine chosen for purpose of illustration, the distance from the first pair of sprockets 45, 46 adjacent the compounding cylinders 29, 30 to the beginning of the critical area or section C is 16 feet and 7 inches. The extent of critical section C is 49 inches. The distance laterally between opposite chains is 48⅞ inches. The distance from the end of section C to the extreme rear end of the light bank is 16 feet and 8 inches. The distance between the beginning and end pairs of sprockets 45, 46 is 43 feet and 4 inches. There are in the neighborhood of 54 rows of lamps 58 in the upper bank of the curing section and 20 rows of lamps in the lower bank. These lamps may be energized by appropriate leads and plugs extending to an energized socket bank 59 above the curing section servicing the upper bank of lamps and to similar socket provisions 60 servicing the lower bank.

If desired, thermocouples $T_1$—$T_{12}$ may be provided, appropriately mounted on the curing section to ride on the upper surface of the cellophane covering envelope of the web, positioned near the transverse center thereof and spaced linearly of the section, to indicate the heat of the web at various points of its travel and thereby enable accurate control of the heating effect by switching on or off rows of lamps 58, as desired. I have not shown such provisions in detail in order to simplify the disclosure. However, such thermocouples will be connected to a recording instrument showing the temperature of the laminate at each of a certain number of points along the curing section. When a desired optimum temperature has been determined for each point, for a laminate of given composition, it is thereafter possible to operate the apparatus either manually or automatically by use of thermostats so as to yield the desired temperature curve during curing. This control is effected by either varying the heat emitted by the lamps 58 or regulating the speed of the machine, in a manner which will be apparent. As a practical suggestion for the thermal control, I arrange the rows of lamps in the upper and lower banks, respectively, in pairs which are connected in series, so that each pair of upper and lower rows can be turned on or off independently of all other pairs.

The laminate emerges from the curing section 40 in a fully or partially cured condition, according to the desired method of operation. The outer covering sheets 32 constituting the envelope of web 39 are stripped from the laminate by being passed over guide rolls 61 (see Fig. 1) and wound on collecting rolls 62 driven by means not shown. The finished laminate, designated 63 in Fig. 1, may be cut into sheets, rolled or otherwise prepared for handling or shipment. The intermediate or separator web 27 of cellophane may be stripped off by hand after the laminates are cut into lengths. By selecting the proper cloth and resin, flexible laminates can be made which need not be cut into lengths but may be wound into rolls.

The extent to which the curing process has proceeded may be gauged readily by the occurrence or non-occurrence of blisters in the cellophane webs 32 which constitute the envelope of the advancing web 39. Such blisters indicate that the resin has reached a certain degree of hardness resulting in the separation of the cellophane from the laminate 63. Depending upon the character of the fabric incorporated therein, i. e., whether it is heat treated or not, or on other characteristics thereof, and on the character of the resin employed for impregnation purposes, these blisters will appear at the end of or following the critical zone C or at its center or beginning. Hence, depending upon the degree of curing desired adjustment of the heat or speed of the apparatus should be made to produce the desired curing effect. In some cases formation of the blisters is rare or they never occur, and the criterion to be followed in the control of the apparatus is the temperature of the web at various successive points in its travel. Sharp peaks in the temperature curve plotted by observation of the readings of thermocouples are to be avoided. In Fig. 7 I show a time-temperature graph comparing a curve generally indicative of the type of time-temperature relationship tending to be obtained in the practice of the present invention with a curve showing the tendency in a process involving the uniform application of external heat, shown in dotted lines. It will be observed that this last named curve exhibits a sharp peak period of polymerization, whereas in distinction therefrom the solid line curve exemplifying the operation of the present process is continuous and gradual throughout.

As the laminate progresses through the curing section, the cellophane webs 32 are heated to temperatures at which they tend to shrink. Transverse shrinkage is prevented by the gripping links which are held tightly in place by channels 53, 54, with the result that the tension on the cellophane increases. This tension is transmitted to the laminates in a direction substantially perpendicular to the surface thereof and more importantly, transversely thereto, the latter being made possible by the extremely close contact between the cellophane and the laminate resulting from the vacuum produced within the cellophane envelope in the region of the laminate, as explained hereinbefore. The tension on the cellophane and laminates is further increased by the tentering action of the gripping links and their carrying chains, the two pairs of chains being one-half inch nearer together at the point at which the cellophane is first gripped than they are ten feet further on (linearly, in the plane of the laminates), but being thereafter substantially parallel. Because of the small scale employed in the drawings, this separation of the chains is not illustrated, each pair of chains appearing to be contained in a vertical plane. It is preferable that the curing section 40 be enclosed in a cellophane or other type curtain or enclosure so as to minimize temperature changes due to drafts and undue cooling of the edges of the laminate.

The invention is not limited to the particular embodiments illustrated. The apparatus may be of different proportions; the various parts may be differently arranged; and many different kinds of material may be employed in the construction. In particular, the apparatus may be made wider, to accommodate wider cloth, and longer, to make possible an increased running speed with consequent increased output for given materials or to accommodate materials which require more prolonged curing treatment than might be practical with the apparatus illustrated.

The heat lamps may be differently arranged. The distance between the heat lamps and the laminate may be varied. Heat lamps of many different kinds may be employed. Instead of heat lamps, other sources of heat may be used, although it is preferred to use in each heating area a plurality of heating units each of which is relatively directional and capable of being turned on or off independently of other units. Heat lamps of the infrared type are preferred as a source of heat since they do not appreciably heat the atmosphere and since, immediately upon being turned off, the application of heat to the laminate is discontinued. This makes for excellent temperature control. Instead of employing heat energy other kinds of energy may be employed for solidifying the resin impregnant. For instance, actinic light (e. g., ultraviolet radiation) may be employed, particularly where the resin contains a light-activating catalyst. Actinic light may be used in conjunction with heat, either simultaneously or sequentially.

For purpose of example, the temperature of the laminate may range throughout the 12 thermocouple stations from a minimum of 80° F. to a maximum of 324° F. during the curing phase, issuing from the heating section at about 164° F.

Instead of cellophane there may be employed as covering and separating material substantially any flexible, non-bibulous sheet material. Examples of other suitable material are cellulose acetate, cellulose acetate-butyrate, cellulose acetate-propionate, polyvinyl alcohol, polyvinyl acetate, polyvinyl chloride, rubber derivatives, synthetic linear polyesters, polyamides, polyesteramides, etc., any of which may be plasticized if necessary to acquire the requisite flexibility. The material should be transparent, although this requirement may be dispensed with in some cases. In order to take full advantage of the principles of the invention, the covering material should be of such a nature as to tend to contract when heated. This character is ordinarily particularly apparent in sheet material which has been cold drawn transversely in manufacture.

The external finish of the laminate is derived from the external finish of the covering and separating webs 32, 27, respectively. A smooth finish, such as usually characterizes cellophane webs, is often desired. However, a matte finish or patterned effects are likewise possible.

The impregnant should be a resin or resin-forming compound or mixture substantially free from polymerizable solvent at the time of entrance into curing section 40. Preferred resin forming compounds are unsaturated compounds which polymerize by addition to one another without the elimination of non-resinous by-products such as water, ammonia, etc. Polymerization is attendant with a corresponding reduction in unsaturation.

Among suitable resin-forming compounds available for use in my process are those having in the molecule but a single polymerizable unsaturated carbon-to-carbon linkage. Compounds of this type ordinarily result in resins which are substantially thermo-plastic in character (when the compounds are polymerized alone or in admixture with other such compounds). Examples of compounds of this kind are esters of saturated monohydric alcohols with aliphatic-unsaturated mono-basic acids such as the methyl, ethyl, etc., esters of acrylic, methacrylic, chloroacrylic, etc. acids; esters of aliphatic-unsaturated monohydric alcohols with saturated mono-basic acids such as the vinyl, allyl, methallyl chloroallyl, etc. esters of acetic, chloroacetic, glycolic, propionic, lactic, benzoic, chlorobenzoic, etc. acids; ethers of the above mentioned and other unsaturated monohydric alcohols with the above mentioned and other saturated monohydric alcohols; acetals of aliphatic-unsaturated monohydric alcohols; unsaturated hydrocarbons and substituted hydrocarbons such as styrene, alpha-methylstyrene, dichlorostyrene, etc.

Other suitable resins include those produced by the polymerization of organic compounds containing in the molecule two or more polymerizable unsaturated carbon-to-carbon linkages not conjugated with respect to carbon. Such compounds can ordinarily be polymerized to insoluble, substantially infusible condition. Among such compounds are polyesters of aliphatic unsaturated polybasic acids with saturated monohydric alcohols such as the methyl, ethyl, propyl, etc. polyesters of maleic, fumaric, dichloro maleic, itaconic, citraconic, etc. acids; polyesters of unsaturated polyhydric alcohols with saturated monobasic acids; polyesters of unsaturated monohydric alcohols with saturated polybasic acids such as vinyl, allyl, methallyl, etc. esters of oxalic, maleic, succinic, adipic, phthalic, iso-phthalic, terephthalic, etc. acids; polyesters of saturated polyhydric alcohols with unsaturated monobasic acids such as acrylic, methacrylic, chloroacrylic, etc., esters of glycol, diethylene glycol, glycerol, polyglycerols, pentaerythritol, polyvinyl alcohol, polyallyl alcohol, etc.; polyesters of saturated polyhydric alcohols with unsaturated polybasic acids; polyesters of unsaturated polybasic alcohols with saturated polybasic acids, etc.

These resins may be employed alone or in admixture with one another or with any other polymerizable or polymerized compounds. Particularly attractive mixtures are those of one or more readily polymerizable compounds such as styrene, methyl methacrylate, etc., with polyester resins formed by the polyesterification of a saturated polyhydric alcohol with an unsaturated polybasic acid such as a maleic acid. Typical of such polyester resins is that produced by reacting glycol with maleic acid under resin-forming conditions.

For most purposes, the resins should be used in admixture with a polymerization catalyst. Typical polymerization catalysts are benzoyl peroxide, acetyl peroxide, benzoyl acetyl peroxide, lauroyl peroxide, dibutyryl peroxide, succinyl peroxide, sodium peroxide, barium peroxide, tertiary alkyl hydroperoxides such as tertiary butyl hydroperoxide (often called simply tertiary butyl peroxide), di (tertiary alkyl) peroxides such as di (tertiary butyl) peroxide, peracetic acid, perborates, persulfates, etc. In some cases metals and metallic salts may be used as polymerization catalysts. If desired, mixtures of polymerization catalysts may be used. In some cases it may be desirable to conduct the polymerization in the concurrent presence of both a catalyst and an inhibitor of polymerization. Amounts of peroxide catalyst between about 0.01% and about 5% by weight of the polymerizable unsaturated compound or compounds are usually satisfactory, although the amount is not necessarily limited to this range.

The resin impregnants may contain many kinds of modifying agents such as dyes, pigments, fillers, stabilizers, lubricants, inhibitors, fire-retardants, etc. Typical plastic modifiers include cellulose nitrate, cellulose acetate, cellulose acetate-butyrate, cellulose acetate-propionate, ethyl cellulose, methyl cellulose, hydroxy-methyl cellulose, synthetic linear polyesters, polyamides, etc. and polymers of unsaturated compounds such as those mentioned hereinbefore. Waxes, etc. are common modifiers.

The invention is not limited to the use of any particular kind of bibulous sheet material. For most purposes the material should be relatively flexible and capable of ready impregnation. Most such materials are fibrous in character. Examples of suitable bibulous materials are alpha-cellulose paper, kraft paper, sulfite paper. Knitted, woven or other textile fabric which may be constructed of cotton, hemp, jute, etc. may be used. Animal fibers such as wool, horse hair, silk, etc.; fibers of inorganic origin such as those of glass (glass fabric in many cases being preferably heat-treated to remove spinning oil and sizing before impregnation) or synthetic fibers such as those of the natural proteins, e. g., casein, soybean meal, etc., or fibers derived from cellulose, e. g., regenerated cellulose, cellulose acetate, cellulose acetate-butyrate, etc. Another important class of fibers consists of those comprising synthetic resins, as represented by synthetic linear polyamides (the nylons) and interpolymers of vinyl halides with vinyl esters, e. g., Vinyon. Of these synthetic resins, thermoplastic resins capable of macromolecular orientation by cold drawing are preferred.

A single sheet of bibulous sheet material may be impregnated and cured in accordance with the invention or two or more sheets of the same or different bibulous material may be cured separately or in contact with one another. Laminates can be produced from two or more plies of bibulous material.

In some cases the machine may be so operated that one or more of the plies do not pass through an impregnating bath of resins but are partially or fully impregnated by resin squeezed from previously impregnated plies when the laminate passes between the compounding rolls. In such cases it is the usual practice to impregnate alternate plies. If desired, bibulous material may be laminated with non-bibulous material such as metal foil, etc. It should be clearly understood that the arrangement of heating lamps in the curing section 40 is merely illustrative. The described distribution of lamps may be varied within fairly wide limits consistent with the purpose of the invention and within the scope of the claims. It will readily be appreciated that various conditions such as the character of the fabric and resin, the type of envelope, speed of operation, etc. will call for revision in the arrangement, without, however, departing from the principles of the invention.

The following examples illustrate the applicability of my improvements to the processing of laminates of various compositions, it being understood that in all cases a curing treatment is employed involving the cessation of application of external heat at the critical zone C through the peak period of polymerization. In each case the distribution of intensity of heat by lamps 58, 58' in sections A, B, D and E is chosen with a view to the responsivity of the laminate composition in the curing phase, in accordance with the above defined criterion. In each example the conditions set forth apply to a curing run at a sufficient time after its beginning to enable the margins and materials to reach equilibrium. Temperatures were observed at the twelve thermocouples $T_1$ through $T_{12}$.

*Example A*

1. Composition of resin impregnant:
   Bakelite XRS 17582 (polymerizable phenol formaldehyde produced by Carbide & Carbon Chemicals Corporation)—254 lbs.
   Styrene—25 lbs.
   Benzoyl peroxide—3 lbs.
2. Viscosity of resin:
   35,000 centipoises at 60° F.
3. Nature of laminate plies:
   Glass cloth (not heat treated) ECC (11) 162, 44" wide (4 plies)
4. Nature of separator web:
   Plain transparent cellophane, not moisture proof, 300 gauge, approximately 45½", wide
5. Nature of covering webs:
   Plain transparent cellophane 600 gauge, 51" wide
6. Speed of machine:
   6½ ft. per min.
7. Temperatures observed:

$T_1$—118° F.  $T_7$—283° F.
$T_2$—156° F.  $T_8$—315° F.
$T_3$—255° F.  $T_9$—322° F.
$T_4$—291° F.  $T_{10}$—322° F.
$T_5$—203° F.  $T_{11}$—274° F.
$T_6$—248° F.  $T_{12}$—191° F.

*Example B*

1. Composition of resin impregnant:
   Bakelite XRS 17582—244 lbs.
   Styrene—25 lbs.
   Benzoyl peroxide—3 lbs.
2. Viscosity of resin:
   35,000 centipoises at 60° F.
3. Nature of laminate plies:
   Glass cloth (not heat treated) ECC (11) 162, 44" wide (4 plies)
4. Nature of separator web:
   Plain transparent cellophane, not moisture-proof, 300 gauge, approximately 45½" wide
5. Nature of covering webs:
   Plain transparent cellophane 600 gauge, 51" wide
6. Speed of machine:
   7 ft. per min.

7. Temperatures observed:

| | |
|---|---|
| $T_1$—80° F. | $T_7$—235° F. |
| $T_2$—190° F. | $T_8$—291° F. |
| $T_3$—242° F. | $T_9$—324° F. |
| $T_4$—290° F. | $T_{10}$—285° F. |
| $T_5$—190° F. | $T_{11}$—254° F. |
| $T_6$—204° F. | $T_{12}$—164° F. |

8. Average Barcol hardness of finished laminate: 55

*Example C*

1. Composition of resin impregnant:
   Bakelite XRS 17582—248 lbs.
   Styrene—30 lbs.
   Benzoyl peroxide—3 lbs.
2. Viscosity of resin:
   35,000 centipoises at 60° F.
3. Nature of laminate plies:
   Glass cloth (not heat treated) ECC (11) 162, 44" wide (4 plies)
4. Nature of separator web:
   Plain transparent cellophane, not moisture-proof, 300 gauge, approximately 45½" wide
5. Nature of covering webs:
   Plain transparent cellephane 600 gauge, 51" wide
6. Speed of machine:
   6 ft. per min.
7. Temperatures observed:

| | |
|---|---|
| $T_1$—149° F. | $T_7$—234° F. |
| $T_2$—162° F. | $T_8$—337° F. |
| $T_3$—251° F. | $T_9$—290° F. |
| $T_4$—212° F. | $T_{10}$—327° F. |
| $T_5$—162° F. | $T_{11}$—238° F. |
| $T_6$—246° F. | $T_{12}$—162° F. |

8. Average Barcol hardness of finished laminate: 45–50

What I claim is:

1. A process of curing laminates impregnated with a material which is characterized by an exothermic phase during polymerization, comprising advancing the laminate, subjecting the laminate to the application of polymerization inducing rays during a substantial portion of each of a relatively early and a later phase of advance, and interrupting the application of said rays during a phase of the advance intermediate said early and later phases, whereby curing proceeds exothermically during said intermediate phase.

2. A process of curing laminates impregnated with a material which is characterized by an exothermic phase during polymerization, comprising advancing the laminate, subjecting the laminate to the application of polymerization inducing rays during a substantial portion of each of a relatively early and later phase of advance, interrupting the application of said rays during a phase of the advance intermediate said early and later phases, whereby curing proceeds exothermically during said intermediate phase, and correlating the intensity of said rays with said intermediate exothermic phase, whereby an overall curing action of relatively uniform temperature gradient results.

3. A process of curing laminates impregnated with a material which is characterized by an exothermic phase during polymerization, comprising continuously advancing the laminate, subjecting the laminate to the application of polymerization inducing heat rays during a substantial portion of each of a relatively early and a later phase of advance, interrupting the application of said rays during a phase of the advance intermediate said early and later phases, whereby curing proceeds exothermically during said intermediate phase, and correlating the intensity of said rays with said intermediate exothermic phase, whereby an overall curing action of relatively uniform temperature gradient results.

4. A process comprising continuously advancing a web impregnated with a polymerizable material within a continuous concomitantly advancing envelope of a sheet material, gripping the edges of said envelope without gripping said web, transversely tensing said envelope, and polymerizing said impregnating material.

5. A process comprising continuously advancing a web of bibulous sheet material impregnated with a polymerizable material within a continuous concomitantly advancing envelope of a non-bibulous sheet material, gripping the edges of said envelope without gripping said web, transversely tensing said envelope, and polymerizing said impregnating material.

6. A process comprising continuously advancing a web impregnated with a polymerizable material within a continuous concomitantly advancing envelope of a thermoshrinking sheet material, gripping the edges of said envelope without gripping said web, transversely tensing said envelope by subjecting it to an elevated temperature while substantially preventing contraction, and polymerizing said impregnating material.

7. A process comprising disposing a web impregnated with a polymerizable material within an envelope of sheet material, gripping and transversely tensing said envelope, and polymerizing said impregnating material.

8. A process comprising disposing a web of bibulous sheet material impregnated with a polymerizable material within an envelope of non-bibulous sheet material, gripping and transversely tensing said envelope, and polymerizing said impregnating material.

9. A process comprising disposing a web impregnated with a polymerizable material within an envelope of thermoshrinking sheet material, gripping and transversely tensing said envelope by subjecting it to an elevated temperature while preventing contraction, and polymerizing said impregnating material.

10. A process comprising continuously advancing a web of bibulous sheet material impregnated with a liquid plastic along a path having two linearly disposed heated areas and a non-heated area intermediate said first two areas, whereby said plastic is solidified.

11. A process comprising continuously advancing a polymerizable resin-impregnated web of bibulous sheet material along a path having two linearly disposed areas containing energized polymerization activators and a third area intermediate said first two areas, said third area containing no energized polymerization activators, whereby said resin is polymerized.

12. A process comprising continuously advancing a polymerizable resin-impregnated web of bibulous sheet material within a continuous concomitantly advancing envelope of non-bibulous sheet material along a path having two linearly disposed areas containing energized polymerization activators and a third area intermediate said first two areas, said third area containing no energized polymerization activators, whereby said resin is polymerized.

13. A process comprising continuously advancing a polymerizable resin-impregnated web of bibulous sheet material within a continuous concomitantly advancing envelope of non-bibulous sheet material, transversely tensing said envelope and polymerizing said resin.

14. A process comprising continuously advancing a polymerizable resin-impregnated web of bibulous sheet material within a continuous concomitantly advancing envelope of non-bibulous sheet material, gripping the edges of said envelope without gripping said bibulous web, transversely tensing said envelope and polymerizing said resin.

15. A method of forming laminates comprising advancing successive plies of a material impregnated with a non-solid polymerizable impregnant and thermoshrinking covering material, squeezing and laminating said plies while laterally confining the impregnant adjacent the edges of the first named material and internally of the edges of the covering material, whereby to constitute a bead paralleling the direction of advance, and curing said impregnant while laterally tensing said covering material.

16. A method of forming laminates comprising advancing successive plies of a material impregnated with a non-solid polymerizable impregnant and thermoshrinking covering material, squeezing and laminating said plies while laterally confining the impregnant adjacent the edges of the first named material and internally of the edges of the covering material, whereby to constitute a bead paralleling the direction of advance, curing said impregnant while laterally tensing said covering material, and stripping said covering material from the first named material.

17. A method of forming laminates comprising advancing successive plies of a material impregnated with a non-solid polymerizable impregnant and thermoshrinking covering material, squeezing and laminating said plies while laterally confining the impregnant adjacent the edges of the first named material and internally of the edges of the covering material, whereby to constitute a bead parallel to the direction of advance, and curing said impregnant while laterally tensing said covering material by subjecting the same to heat while preventing contraction thereof.

18. A method of processing materials containing a polymerizable impregnant, comprising advancing and impregnating a web of material with said impregnant in a liquid form, concomitantly advancing webs of material, compressively associating the last named webs in covering relation to said first named web while laterally confining the liquid impregnant, which is squeezed out of the first named web as a result of the compression, adjacent the side margin of said first named web, whereby to define a bead of said impregnant extending parallel to the path of web advance adjacent the side thereof, and polymerizing said impregnant.

19. A method of processing materials containing a polymerizable impregnant, comprising advancing and impregnating a web of material with said impregnant in a liquid form, concomitantly advancing webs of material of greater width than said first named web, compressively associating the last named webs in covering relation to said first named web while laterally confining the liquid impregnant, which is squeezed out of the first named web as a result of the compression, adjacent the side margin of said first named web and internally of the margin of the covering webs, whereby to define a bead of said impregnant extending parallel to the path of web advance adjacent the side thereof, and polymerizing said impregnant.

20. An apparatus for curing polymerizable materials of the type described, comprising two linearly disposed areas, energized polymerization activators and a third area intermediate said two areas, said third area containing substantially no energized polymerization activators, and means for moving the polymerizable materials through said areas to polymerize said materials.

21. An apparatus for curing polymerizable materials of the type described, comprising a path having two linearly disposed areas, means in said area to provide polymerization activating energy and a third area intermediate said two areas, said third area being not subjected to polymerization activating energy, and means for continuously advancing a web along said path.

22. An apparatus for curing materials containing a polymerizable substance characterized by exothermic action during polymerization, comprising means for advancing said material in a predetermined path, and a curing or polymerizing means located in the path of advance, comprising initial means for directing polymerizing rays on the material during initial advance thereof, and further means spaced from said initial means with reference to the direction of advance for directing polymerizing rays on said material to complete the desired polymerization, there being a zone along said path intermediate said initial and further means which is substantially free from polymerizing means, whereby polymerization in said zone proceeds primarily under said exothermic action.

23. An apparatus for producing laminates impregnated with a polymerizable substance, comprising means for feeding and impregnating a web with a non-solid polymerizable impregnant, means for compressively associating a covering web with said first named web in laminated relation thereto during advance, comprising a pair of pressure rollers acting on opposite sides of said respective webs, means for laterally confining liquid impregnant exuded from said first named web as a result of said compression, comprising a conformed control element positioned adjacent the bight of said rollers and adjacent a margin of said first named web, whereby said exuded impregnant is defined in the form of a bead paralleling the direction of advance of the webs, and means for controllably polymerizing said impregnant and bead following passage of the webs through said rollers.

24. An apparatus for producing laminates impregnated with a polymerizable substance, comprising means for feeding and impregnating a web with a non-solid polymerizable impregnant, means for compressively associating a covering web with said first named web in laminated relation thereto during advance, comprising a pair of pressure rollers acting on opposite sides of said respective webs, means for laterally confining liquid impregnant exuded from said first named web as a result of said compression, comprising a conformed control element positioned adjacent the bight of said rollers and adjacent a margin of said first named web, whereby said exuded impregnant is defined in the form of a bead paralleling the direction of advance of the webs, means for controllably polymerizing said impregnant and bead following passage of the webs through said rollers.

25. An apparatus for producing laminates impregnated with a polymerizable substance, comprising means for feeding and impregnating a web with a non-solid polymerizable impregnant, a pair of pressure rollers spaced from said feeding means for compressively associating covering webs with said first named web in laminated relation thereto during advance, said pressure rollers acting on opposite sides of said respective covering webs, means associated with said pressure rollers for laterally confining liquid impregnant exuded from said first named web as a result of said compression, said last mentioned means comprising a bead controller element positioned adjacent the bight of said rollers and adjacent a margin of said first named web, whereby the lateral flow of said exuded impregnant is limited and formed into a bead paralleling the direction of advance of the webs, and means spaced from said pressure rollers and operated in timed relation thereto for stripping said covering web from the first named web following polymerization.

26. An apparatus for producing webs impregnated with a polymerizable substance, comprising means for advancing a web impregnated with a liquid polymerizable impregnant, means for compressing said impregnated web, means associated with said compressing means for laterally confining liquid impregnant exuded from said first named web as a result of said compression, said last mentioned means forming a bead paralleling the direction of advance of said web, and means spaced from said compressing means for polymerizing said impregnant and said bead.

27. An apparatus for producing a web impregnated with a polymerizable substance, comprising means for advancing a web impregnated with a liquid polymerizable impregnant, a pair of pressure rollers operating on opposite sides of said impregnated web for compressing the same, means associated with said pressure rollers for laterally confining liquid impregnant exuded from said first named web as a result of said compression, said last mentioned means comprising a control element positioned adjacent the bight of said rollers and the margin of said impregnated web, said control element being constructed to limit the lateral flow of said exuded impregnant and to form a bead paralleling the direction of advance of said web, and means spaced from said pressure rollers for polymerizing said impregnant and said bead.

28. In apparatus for processing a web laminate, including coacting cylinders for associating a plurality of web plies, at least one of which contains a liquid impregnant, means for laterally confining said impregnant adjacent a margin of said last named web and for building up a marginal bead therebeside, comprising a conformed bead controller having a concave surface adjacent said rollers for entry into the bight thereof, said controller being engageable with a web traversing said rollers to laterally seal the space between the webs and prevent loss of impregnant.

29. In apparatus for processing a web laminate, including coacting cylinders for associating a plurality of web plies, at least one of which contains a liquid impregnant, means for laterally confining said impregnant adjacent a margin of said last named web and for building up a marginal bead therebeside, comprising a transparent conformed bead controller having a concave surface adjacent said rollers for entry into the bight thereof, said controller being engageable with a web traversing said rollers to laterally seal the space between the webs and prevent loss of impregnant.

30. Apparatus of the type described, comprising means for impregnating a traveling web with a polymerizable substance, means spaced from said impregnating means to preliminarily treat said impregnant for improved polymerizing action, means to compressively associate said impregnated web with a pair of covering webs in temporary laminated relation, means cooperating with said web associating means to laterally confine impregnant squeezed from the side edges of said first named web, said means being constructed to form a bead paralleling the direction of travel of said web, and means spaced from said web associating means to polymerize said impregnant, said last mentioned means including spaced initial and subsequent polymerizing ray emitting elements, and said elements being separated by a zone of substantial extent intermediate said initial and subsequent elements which is substantially free from said elements.

31. Apparatus of the type described, comprising means for impregnating a traveling web with a polymerizable substance, means spaced from said impregnating means for preliminarily subjecting said impregnant to polymerizing action, means to compressively associate said impregnated web with covering webs in temporary laminated relation, means associated with said last mentioned means to laterally confine impregnant squeezed from said first named web and to form a bead paralleling the direction of travel of said first named web, means spaced from said associating means to polymerize said impregnant, said polymerizing means including spaced initial and subsequent elements emitting polymerizing rays, and said elements being separated by a zone of substantial extent which is substantially free from said elements, and means spaced from said polymerizing elements to strip said covering webs from the first named web.

32. Apparatus of the type described, comprising means for impregnating a traveling web with a polymerizable substance, means spaced from said impregnating means to preliminarily subject said substance to polymerization improving action, means spaced from said last mentioned means to compress said impregnated web, and means spaced from said compressing means to complete the polymerization of said impregnant.

33. Apparatus of the type described, comprising means for impregnating a traveling web with a polymerizable substance, means spaced from said impregnating means to preliminarily subject said polymerizable substance to polymerizing action, means spaced from said last mentioned means to compress said impregnated web, and means spaced from said compressive means to complete the polymerization of said polymerizable substance, said polymerization completing means including spaced initial and subsequent elements emitting polymerizing rays, and said initial and subsequent ray emitting elements being separated by a zone of substantial extent which is substantially free from said elements.

34. Apparatus of the type described, comprising in combination means for impregnating a traveling web with a polymerizable substance, means to preliminarily subject said polymerizable substance to polymerizing action, means to compressively associate said impregnated web with covering webs in temporary laminated relation, means to continue polymerization of said polymerizable substance, and means to strip said covering webs from the first named web, all of said means being operated in timed relation to each other.

LAWRENCE B. GREEN.

REFERENCES CITED

The following references are of record in the file of this patent:

UNITED STATES PATENTS

| Number | Name | Date |
|---|---|---|
| 2,224,922 | Sutherland | Dec. 17, 1940 |
| 2,264,376 | Hiltner | Dec. 2, 1941 |
| 2,268,611 | Mitchell | Jan. 6, 1942 |
| 2,320,513 | Drummond | June 1, 1943 |
| 2,367,670 | Christ | Jan. 23, 1945 |
| 2,402,631 | Hull | June 25, 1946 |
| 2,429,177 | Young | Oct. 14, 1947 |